(12) United States Patent
Kiilerich et al.

(10) Patent No.: US 7,801,847 B2
(45) Date of Patent: Sep. 21, 2010

(54) MEDIA FILE CONVERSION USING PLUG-INS

(75) Inventors: Dennis A. Kiilerich, Kirkland, WA (US); Kipley J. Olson, Mercer Island, WA (US); Madhuvan Gupta, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 232 days.

(21) Appl. No.: 11/389,992

(22) Filed: Mar. 27, 2006

(65) Prior Publication Data
US 2007/0226238 A1 Sep. 27, 2007

(51) Int. Cl.
*G06F 7/00* (2006.01)

(52) U.S. Cl. .................. 707/609; 707/610; 707/640; 707/821

(58) Field of Classification Search .......... 707/4, 707/10, 101, 104.1
See application file for complete search history.

(56) References Cited

U.S. PATENT DOCUMENTS

| | | | |
|---|---|---|---|
| 5,410,698 A | | 4/1995 | Danneels et al. |
| 5,506,932 A | * | 4/1996 | Holmes et al. .............. 704/205 |
| 6,094,684 A | * | 7/2000 | Pallmann .................... 709/227 |
| 6,269,368 B1 | | 7/2001 | Diamond |
| 6,476,802 B1 | | 11/2002 | Rose et al. |
| 6,549,922 B1 | | 4/2003 | Srivastava et al. |
| 6,609,130 B1 | * | 8/2003 | Saulpaugh et al. .......... 707/102 |
| 6,742,176 B1 | * | 5/2004 | Million et al. .............. 717/120 |
| 6,934,467 B1 | | 8/2005 | Herz |
| 6,961,430 B1 | | 11/2005 | Gaske et al. |
| 7,039,643 B2 | * | 5/2006 | Sena et al. .................. 707/101 |
| 7,200,668 B2 | * | 4/2007 | Mak et al. ................... 709/230 |
| 7,401,100 B2 | * | 7/2008 | Jung et al. ............... 707/104.1 |
| 7,636,738 B2 | * | 12/2009 | Shibata et al. .............. 707/200 |
| 2002/0138619 A1 | * | 9/2002 | Ramaley et al. ............. 709/226 |
| 2002/0174135 A1 | * | 11/2002 | Pellegrin et al. ............ 707/200 |
| 2003/0001978 A1 | | 1/2003 | Smith et al. |
| 2003/0126608 A1 | | 7/2003 | Safadi et al. |
| 2003/0182450 A1 | * | 9/2003 | Ong et al. .................... 709/246 |
| 2003/0185542 A1 | | 10/2003 | McVeigh et al. |
| 2004/0064500 A1 | | 4/2004 | Kolar et al. |
| 2004/0186854 A1 | * | 9/2004 | Choi ........................ 707/104.1 |
| 2004/0237750 A1 | * | 12/2004 | Smith et al. ..................... 84/1 |
| 2004/0242269 A1 | * | 12/2004 | Fadell ...................... 455/556.2 |

(Continued)

OTHER PUBLICATIONS

Landfeldt, "A Method and System for Consolidating Multimedia Object Management in Heterogeneous Media Systems," NSW 2006, University of Sydney, 5 pgs., http://www.cs.usyd.edu.au/~bjornl/research/papers/Sympotic04.pdf.

(Continued)

*Primary Examiner*—Apu M Mofiz
*Assistant Examiner*—Jessica N Le
(74) *Attorney, Agent, or Firm*—Senniger Powers LLP

(57) ABSTRACT

A media player for use with any file format is provided. The system receives a file and provides it to a plug-in to generate a corresponding file having a native file format if the file is not already in a native file format. The system stores both the original file and the converted file, or the original file if no converted file is generated. When synchronizing media content to a media device, the system provides the file having a file format corresponding to a file format preferred by the media device.

17 Claims, 4 Drawing Sheets

U.S. PATENT DOCUMENTS

| | | | |
|---|---|---|---|
| 2004/0260786 | A1 | 12/2004 | Barile |
| 2005/0005760 | A1* | 1/2005 | Hull et al. .................... 84/645 |
| 2005/0246451 | A1 | 11/2005 | Silverman et al. |
| 2005/0286497 | A1* | 12/2005 | Zutaut et al. ................ 370/352 |
| 2005/0289617 | A1 | 12/2005 | Safadi et al. |
| 2006/0007479 | A1 | 1/2006 | Henry et al. |
| 2006/0020636 | A1* | 1/2006 | Murotani .................... 707/200 |
| 2006/0031889 | A1 | 2/2006 | Bennett et al. |
| 2006/0069803 | A1* | 3/2006 | Clark et al. ................. 709/237 |
| 2006/0123064 | A1* | 6/2006 | Kim et al. ................... 707/201 |
| 2006/0184573 | A1* | 8/2006 | Koori ...................... 707/104.1 |
| 2007/0067242 | A1* | 3/2007 | Lotspiech et al. ............. 705/57 |
| 2007/0073747 | A1* | 3/2007 | Jung et al. .................. 707/100 |
| 2007/0078898 | A1* | 4/2007 | Hayashi et al. .......... 707/104.1 |
| 2007/0088727 | A1* | 4/2007 | Kindig ....................... 707/101 |
| 2007/0143346 | A1* | 6/2007 | Matsutani ................ 707/104.1 |
| 2007/0185909 | A1* | 8/2007 | Klein et al. .............. 707/104.1 |
| 2007/0220024 | A1* | 9/2007 | Putterman et al. ........... 707/101 |
| 2007/0220048 | A1* | 9/2007 | Ott .......................... 707/104.1 |
| 2007/0260615 | A1* | 11/2007 | Shen ......................... 707/100 |
| 2008/0046466 | A1* | 2/2008 | Yun ........................ 707/104.1 |
| 2009/0070438 | A1* | 3/2009 | Bartholomew .............. 709/219 |
| 2009/0216776 | A1* | 8/2009 | Carol et al. ................... 707/10 |

OTHER PUBLICATIONS

Sastry et al., "Webtour: A System to Record and Playback Dynamic Multimedia Annotations on Web Document Content," 1999, pp. 175-178, http://delivery.acm.org/10.1145/320000/319925/p175-sastry.pdf?key1=319925&key2=9561680411&coll=GUIDE&dl=GUIDE&CFID=69725778&CFTOKEN=94959612.

Xin et al., "Bit Allocation for Joint Transcoding of Multiple MPEG Coded Video Streams," 2001 IEEE International Conference on Multimedia and Expo, pp. 9-12, http://ieeexplore.ieee.org/iel5/8766/27769/01237642.pdf?isNumber=.

MusicMatch, MusicMatch Jukebox Use's Guide, Feb. 7, 2003. Chapters A1-A6 and 1-9.

\* cited by examiner

MEDIA FILE CONVERSION USING PLUG-INS

BACKGROUND

When a media player application is first released, it has a limited number of supported or native file formats. It is not feasible for a media player application to natively support all file types, codecs, and Digital Rights Management (DRM) schemes. Further, the media player application does not support different file types, codecs, and DRM schemes developed after the release of the media player application.

To overcome this limitation, media player application developers have provided Application Program Interface specifications (API's) that allow third-party developers to interface with the media player. When a file of a certain type is selected for rendering by the media player, the software from the third-party developer is called to render the contents of the file. In this method, the file may be unreadable, metadata may not be available, a codec compatible with the media player may not be available, or the media player may not recognize the DRM scheme.

SUMMARY

In one embodiment, the invention provides a system and method for invoking plug-ins to convert a media file to a format usable by the media player. This embodiment stores the original file and the converted file. Because of the way in which the original and converted files are stored, one embodiment of the invention provides for creating or recreating a database that identifies all of the media content available to the media player or file library system and correlates original files to their associated converted files.

In another embodiment, a system and method are provided for synchronizing media content to a media device. The media player or file library system determines supported and preferred file formats from the media device. The media player or file library system then provides the original file or the converted file, depending on which format the device prefers. Optionally, the media player or file library system may convert the media content to a preferred format if the media content is not immediately available to the media player or file library system in a preferred file format.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
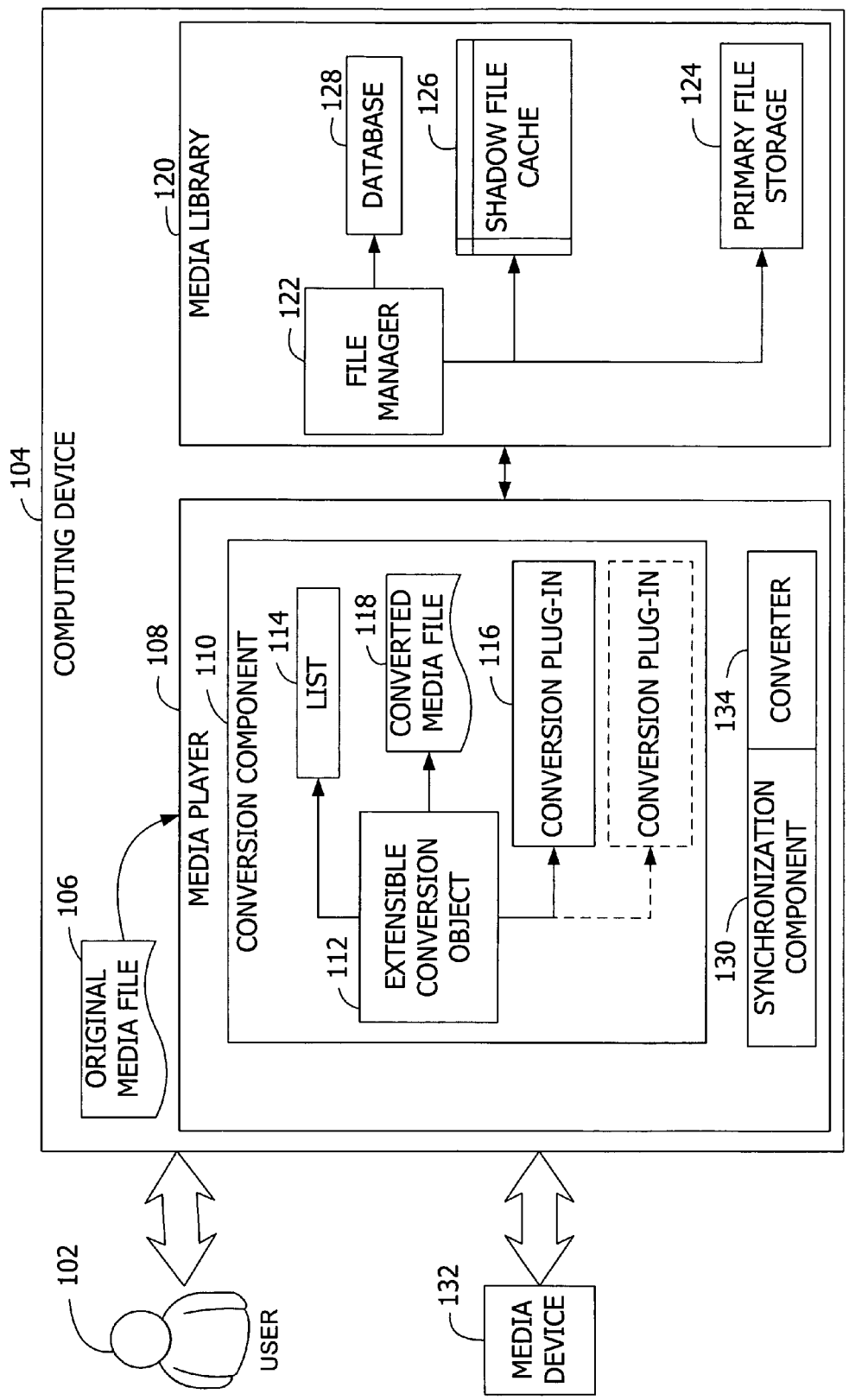
FIG. 1 is a block diagram illustrating a computing device having a media player with a conversion component and a synchronization component according to one embodiment of the invention.

In one embodiment of the invention as illustrated in FIG. 1, a user 102 interacts with a computing device 104, causing a first media file, herein referred to as original media file 106, to be provided to a media player application 108 residing on the computing device 104. When the media player 108 receives an original media file 106 in a non-native file format, the media player 108 uses a conversion component 110 to generate a corresponding media file in a native file format. The conversion component 110 comprises an extensible conversion object 112 which controls the file format conversion process. The extensible conversion object 112 has a plurality of conversion plug-ins installed (i.e., available to it), such as plug-in 116. Each plug-in is capable of receiving a media file of a particular file format and generating a corresponding media file in a file format native to the media player. The extensible conversion object 112 determines which of the plurality of plug-ins to invoke by accessing a list 114 of installed plug-ins and determining which plug-in is capable of processing the file format of the original media file 106. The extensible conversion object 112 selects and invokes the plug-in 116 which generates a converted media file 118 having a file format native to the media player 108. The extensible conversion 112 object may have publicly available API's so that anyone who develops a new media file format can produce a plug-in for the media player 108 that will allow the media player 108 to access the content of files having the new media file format.

A media library 120, or file library system, for use with one embodiment of the invention may be integral with the media player 108 or separate, even residing on a separate computing device. In the embodiment shown in FIG. 1, the media library 120 is separate from the media player 108 but resides on a common computing device 104. The media player 108 stores both the original media file 106 and the converted media file 118 in the media library 120. The converted media file 118 is added to the media library 120 as a "primary" file while the original media file 106 is added as a "shadow" file. A file manager 122 stores the primary files such as the converted media file 118 in a primary file storage 124. The file manager 122 stores shadow files such as original media file 106 in a shadow file cache 126. The file manager 122 enters data in a database 128 of the media library 120 relating to some or all of the following parameters: content of the stored media files, file name, and file location.

One skilled in the art will recognize that many variations are possible regarding implementations of a file library system for use with the invention such as the media library 120. For example, the shadow file cache 126 may be hidden from the user 102, or shadow files may be stored in the same location as primary files and the shadow files themselves hidden from the user 102. Alternatively, the shadow files may be visible to the user 102. A shadow file may be renamed or stored in a location based on its contents and a predetermined naming or locating convention. A shadow file may or may not be linked to its corresponding primary file in a database. Naming or locating shadow files based on their contents allows a file library system to associate corresponding primary files and shadow files without having a database, and allows a lost or corrupted database to be reconstructed by a simple utility that could be embedded in the file manager 122 or separate.

Figure 2:
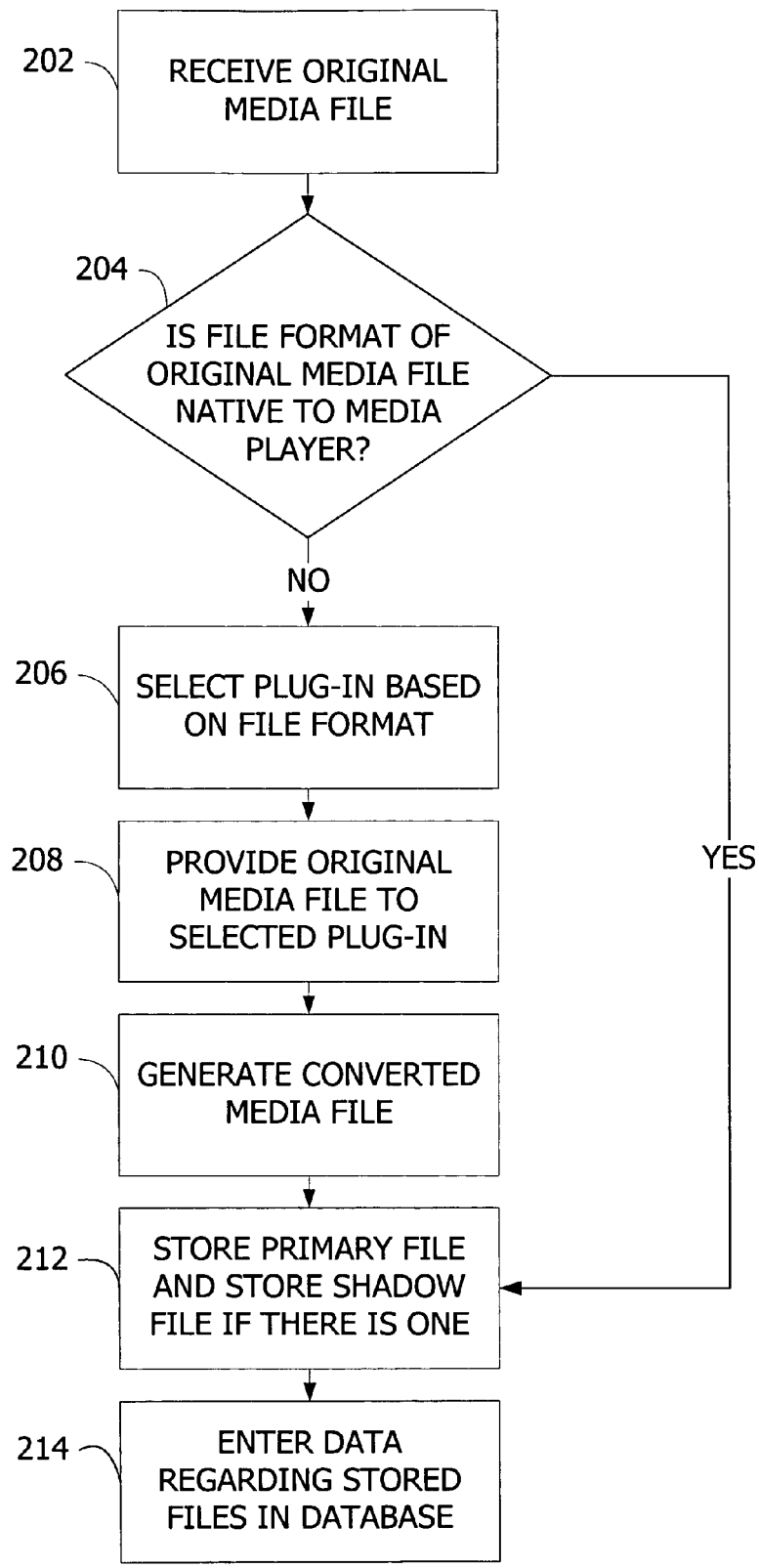
FIG. 2 is a flow chart illustrating a method for receiving media files of a non-native format at a media player application according to one embodiment of the invention.

Referring now to FIG. 2, a method of receiving a media file into a media player having an associated media library is shown. At 202, the media player 108 receives an original media file 106. At 204, the file format of the original media file 106 is identified. If the media player 108 is adapted to render media files having the format of the original media file 106 (i.e., the file format is native to the media player 108), then the original media file 106 is stored as a primary file of the media player 108 at 212 and data entered in a database 128 at 214. If the media player 108 is not adapted to render media files having the format of the original media file 106 (i.e., the file format is non-native to the media player 108), then the media player 108 selects a plug-in from a plurality of plug-ins based on the file format of the original media file 106 at 206. At 208, the selected plug-in 116 is provided with the original media file 106, and at 210, the plug-in 116 generates a converted media file 118. The converted media file 118 is in a file format which the media player 108 is adapted to render. At 212, the original and converted media files are stored as a shadow and primary file respectively. At 214, data regarding media content of the first and converted media files is entered in a database 128 as well as data regarding the original and converted media files (e.g., the locations of the original and converted media files).

A synchronization component 130 also shown in FIG. 1 provides selected media content to a media device 132 in a format preferred by the media device 132. Generally, a user or application selects media content (e.g., a song or video) from a database such as database 128 to be transferred to the media device 132 which the user connects to a communications device of computing device 104. The user 102 may also select media content to be transferred to the media device 132 by selecting a media file (e.g., dragging and dropping the media file to a folder of the computing device 104 wherein the folder represents the memory of the media device 132 which is connected to a communications device of the computing device 104). The communications device of computing device 104 may be a Universal Serial Bus (USB) port, a serial port, a parallel port, an infrared port, a firewire port, a networking port, a Bluetooth transceiver, or any other device by which an electronic device may be connected to a computing device. Some media devices may prefer or require certain file formats. The synchronization component 130 of the media player 108 provides the media device 132 with the selected media content in a file format preferred by the media device 132 if the selected media content is available to the synchronization component 130 in a preferred file format. If the selected media content is not available in a preferred file format, then the synchronization component may convert the media content to a preferred file format via a converter 134. In one embodiment, the converter 134 is an extensible object which manages its own plug-ins to convert the selected media content to a preferred file format. In another embodiment, the functions of converter 134 are performed by extensible conversion object 112 and its associated plug-ins 112. In another embodiment, the converter 134 and extensible conversion object 112 are separate objects which both manage plug-ins 112 to convert media content from one file format to another. If the selected media content is not available in a preferred format, and cannot be converted to a preferred format, then the converter 134 returns an error message to the user 102. Otherwise, the file having the preferred format is transferred to the media device 132 through the communications device of the computing device 104. The media device 132 may be any device having memory such as an MP3 player, a portable media player, a cellular telephone, or a flash memory drive.

A media device may prefer a particular file format for one or more reasons. For example, some file formats support advanced DRM schemes, and other file formats only support certain DRM schemes such that when converting between file formats, the DRM data is lost. Manufacturers of media devices and media content providers may wish to preserve the DRM information. Even though media player 108 does not natively support a particular file format and DRM scheme, it can support the use of the file format and DRM scheme by preserving a file it receives in that file format (e.g., storing a shadow file) and later providing that file to other applications or media devices such as media device 132. Another reason to prefer certain file formats is compression; a file in one file format is smaller than a file in another format having the same media content (e.g., a song stored in WMA file format may be smaller than the same song stored in MP3 file format). Media devices having relatively little memory may prefer a file format utilizing better compression to maximize the amount of media content that the media device can store.

Figure 3:
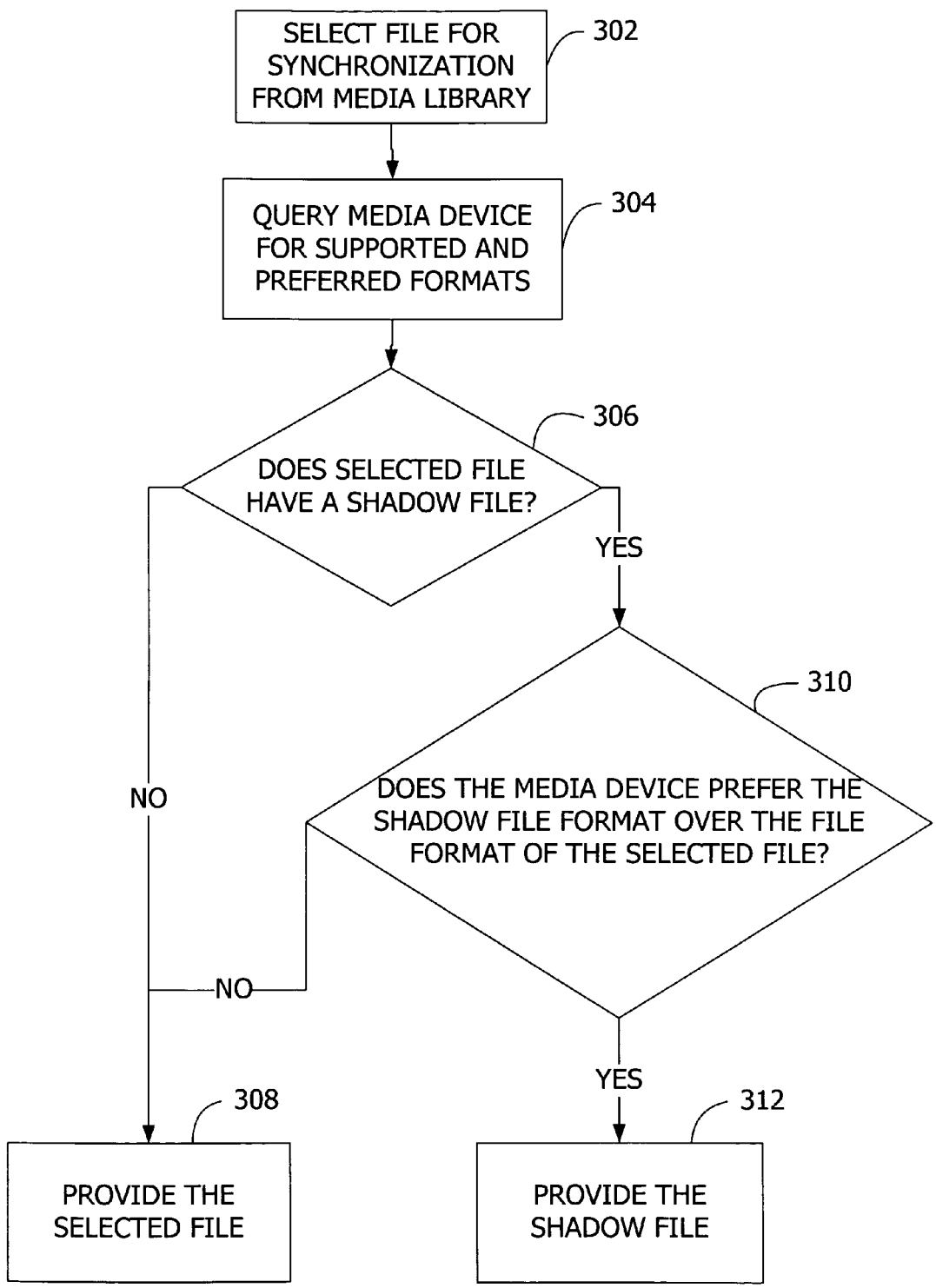
FIG. 3 is a flow chart illustrating a method of synchronizing media files to a media device according to one embodiment of the invention.
Figure 4:
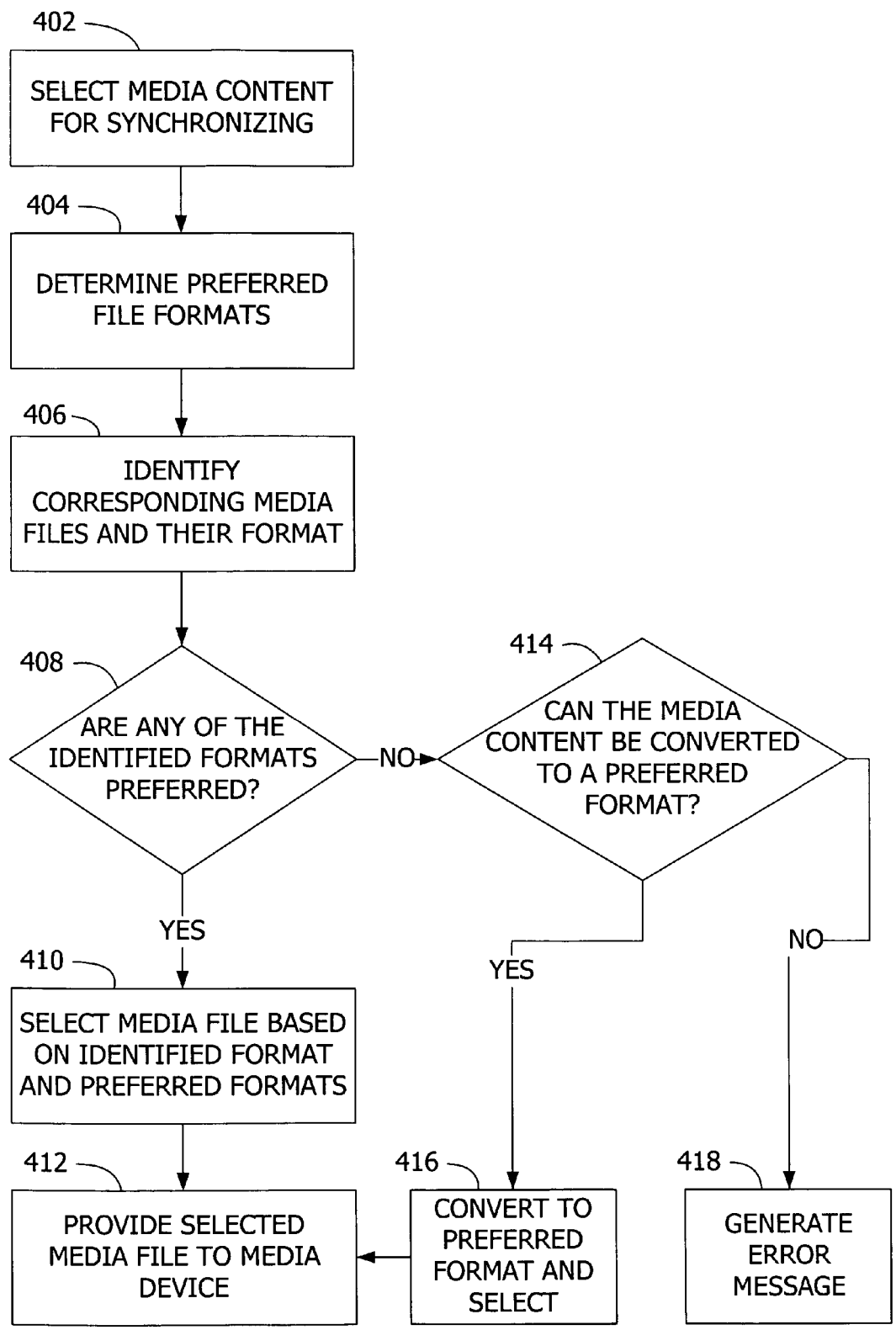
FIG. 4 is a flow chart illustrating a method of synchronizing media content to a media device according to one embodiment of the invention.

FIGS. 3-4 illustrate methods of synchronization that may be employed by synchronization component 130 to provide a media device with a file in a format preferred by the media device 132. FIG. 3 illustrates a method of synchronization based on selecting a media file for synchronization whereas FIG. 4 illustrates a method of synchronization based on selecting media content for synchronization. A media file stores media content (e.g., a song) on a computer readable medium, and a user perceives the media content when the media player 108 renders the media file. In the method of FIG. 3, a media file to be synchronized to the media device 132 is directly selected by a user or application (e.g., the user 102 drags a media file to a folder on a computing device 104, said folder representing a memory of the media device 132), whereas in the method of FIG. 4, a user or application selects media content (e.g., the user 102 highlights a song in the database 128) to be synchronized to the media device 132. The method of FIG. 3 selects the file to be provided to the media device by determining whether the file selected for synchronization by the user or application or a corresponding shadow file is preferred by the media device. The method of FIG. 4 selects the file to be provided to the media device from a plurality of files, all having the selected media content but in different formats. One skilled in the art will recognize that the method of FIG. 4 includes the method of FIG. 3 because selecting media content includes selecting a media file and a selected media file may have one corresponding shadow file. Thus, a synchronization component 130 employing the method of FIG. 4 can select a media file in a preferred format from a plurality of files having the selected media content (e.g., a selected song) wherein the plurality of files may be any number of files (i.e., a primary file and multiple shadow files).

Referring now to FIG. 3, one embodiment of a method of synchronizing a media file to a media device is shown. In this embodiment, a user or application selects a media file to be synchronized from the media player 108, a media library 120, or other file library system, to a media device at 302. At 304, the media device 132 is queried for supported and preferred file formats. The media device 132 may provide its supported and preferred file formats in the form of a single list of supported formats in order of preference to the synchronization component 130. Alternatively, the media device 132 may provide a parameter indicative of the media device 132 (i.e., the media device 132 identifies itself to the computing device 104) and the synchronization component 130 retrieves a list of supported and preferred formats from a memory or server (e.g., a memory of the computing device 104, a memory of a remote computing device, or the memory of a server on the Internet). At 306, the synchronization component 130 checks to see if the selected file has a corresponding shadow file available (i.e., residing on a memory accessible to the synchronization component 130). If there is no corresponding shadow file available, then the synchronization component 130 provides the selected file to the media device 132 at 308. If there is an available shadow file, then the synchronization component 130 checks the list of supported and preferred file formats at 310 to determine whether the shadow file is in a format preferred (indicated at 304) over the selected file (indicated at 302). If it is not, then the selected file is provided to the media device 132 at 308. If the shadow file is in a format preferred over the selected file, then the shadow file is provided to the media device 132 at 312.

Referring to FIG. 4, an embodiment of a method for synchronizing media content to a media device is illustrated. At 402, a user or application selects media content to be synchronized to the media device 132. The synchronization component 130 determines the preferred file formats of the media device 132 at 404. At 406, the synchronization component 130 identifies any available media files corresponding to the selected media content (i.e., any files residing in a memory accessible to the synchronization component 130). At 408, the synchronization component determines whether any of the file formats of the identified files are preferred by the media device 132. If any of the file formats of the identified files are preferred, then at 410, the synchronization component 130 selects the media file in the file format most preferred out of the identified media files. At 410, the synchronization component 130 provides the selected media file to the media device 132. If at 408, none of the file formats of the identified files are preferred, then the synchronization component 130 determines whether a converter 134 can convert the selected media content to a preferred format. If it can, then at 416, the converter 134 converts the selected media content to a preferred file format and at 412, this file is provided to the media device 132. If the converter 134 cannot convert the selected media content to a preferred format, then at 418, an error message is generated.

One skilled in the art will recognize that many variations of the synchronization component 130 and its method of operation are possible. A user may select media content from a database corresponding to a primary media file instead of directly selecting a media file in a media library, database, or other file library system. The user may select one or more files to be synchronized by the synchronization component 130. There may also be more than one shadow file for the selected media content or media file. The synchronization component 130 may determine formats supported by and preferred by the media device before a file or media content is selected for synchronization. The media device 132 may automatically provide a list or parameter indicative of its supported and preferred file formats such that the synchronization component 130 is not required to query the media device 132.

The exemplary operating environment for a media player application according to the invention includes a general purpose computing device such as a computer executing computer-executable instructions. The computing device typically has at least some form of computer readable media. Computer readable media, which include both volatile and nonvolatile media, removable and non-removable media, may be any available medium that may be accessed by the general purpose computing device. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media. The computing device includes or has access to computer storage media in the form of removable and/or non-removable, volatile and/or nonvolatile memory. A user may enter commands and information into the computing device through input devices or user interface selection devices such as a keyboard and a pointing device (e.g., a mouse, trackball, pen, or touch pad). Other input devices, such as a microphone, may be connected to the computing device. A monitor or other type of display device is also connected to the computing device. In addition to the monitor, computers often include other peripheral output devices such as a printer and speakers, which may be connected through an output peripheral interface.

The computer may operate in a networked environment using logical connections to one or more remote computers. The remote computer may be a personal computer, a server, a router, a network PC, a peer device or other common network node, and typically includes many or all of the elements described above relative to the computer. Such networking environments are commonplace in offices, enterprise-wide computer networks, intranets, and global computer networks (e.g., the Internet).

Although described in connection with an exemplary computing system environment, embodiments of the invention are operational with numerous other general purpose or special purpose computing system environments or configurations. The computing system environment is not intended to suggest any limitation as to the scope of use or functionality of embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use in embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Embodiments of the invention may also be practiced in distributed computing environments where tasks are performed by remote processing devices that are linked through a communications network. In a distributed computing environment, program modules may be located in both local and remote computer storage media including memory storage devices.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for use with a plurality of plug-ins for converting a media file to a format which a media player on a computing device of a user is able to render, said method comprising:

receiving an original media file including a first media content at the computing device of the user;

identifying a file format of the received original media file;

if the media player is able to render the identified file format, storing the original media file as a primary file in a database of a media library and further storing content data in the database, said content data relating to and identifying the first media content;

if the media player is unable to render the identified file format:

selecting a plug-in from the plurality of plug-ins as a function of the identified format of the original media file;

providing the original media file to the selected plug-in wherein the selected plug-in generates a converted media file consisting of the first media content of the original media file in a second file format which the media player is able to render, wherein the rendering of the original file is the same as the rendering of the converted file;

renaming the original media file as a function of the first media content and a predetermined naming convention;

storing, by a media library of the computing device, the original media file as a shadow file hidden from the user on a computer readable storage media of the computing device of the user at a location determined as a function of the first media content and a predetermined locating convention;

storing, by the media library, the converted media file on the computer readable storage media as a primary file; and storing content data in a database of the media library, said content data relating to and identifying the first media content of both the shadow file and the primary file without storing any association data between the shadow file and the primary file;

receiving a request for transfer of the original file from the media player to a media device via a drag-and-drop action;

receiving, by the media player from the media device, an identification of the media device;

retrieving a list of supported file formats for the identified media device;

if no shadow file corresponding to the original file exists, providing the primary file corresponding to the original file to the media device; and if the shadow file corresponding to the original file exists, providing the shadow file or the primary file to the media device based on a preference order specified in the retrieved list of supported file formats, wherein said providing comprises retrieving the shadow file from the determined location as a function of the first media content when the shadow file exists and is in a format preferred by the media device over the format of the primary media file.

2. The method of claim 1 further comprising rendering the primary file via the media player.

3. The method of claim 1 wherein the database provides a user interface for displaying the content data, permitting a user to select media content to be rendered by the media player, and providing the file corresponding to the selected media content to the media player for rendering, said provided file having a format which the media player is able to render.

4. The method of claim 1 wherein the shadow file is stored in a first directory hidden from the user and the primary file is stored in a second directory which is viewed by the user.

5. A method of synchronizing a media device with selected media content wherein a plurality of files having different file formats each store the selected media content, said method comprising:

receiving an original media file including a first media content at the computing device of the user;

identifying a file format of the received original media file;

if the media player is able to render the identified file format, storing the original media file as a primary file in a database of a media library and further storing content data in the database, said content data relating to and identifying the first media content;

if the media player is unable to render the identified file format:

selecting a plug-in from the plurality of plug-ins as a function of the identified format of the original media file;

providing the original media file to the selected plug-in wherein the selected plug-in generates a converted media file consisting of the first media content of the original media file in a second file format which the media player is able to render, wherein the rendering of the original file is the same as the rendering of the converted file;

renaming the original media file as a function of the first media content and a predetermined naming convention;

storing, by a media library of the computing device, the original media file as a shadow file hidden from the user on a computer readable storage media of the computing device of the user at a location determined as a function of the first media content and a predetermined locating convention;

storing, by the media library, the converted media file on the computer readable storage media; and storing content data in a database of the media library, said content data relating to and identifying the first media content of both the shadow file and the primary file without storing any association data between the shadow file and the primary file;

receiving a selection of media content to transfer from the computing device to a media device;

determining one or more preferred file formats of the media device, wherein said determining comprises:
 querying the media device for one or more preferred file formats of the media device; and
 receiving data indicative of one or more preferred file formats of the media device at the computing device of the user from the media device in response to said querying;

identifying media files storing the selected media content and identifying the file format of the identified media files, wherein the selected media content is the first media content, wherein the media device is operatively coupled to the computing device having the identified media files, and wherein said identifying comprises determining whether the selected media content has a corresponding shadow file;

selecting one of the identified media files as a function of the identified file format of each media file and as a function of the determined preferred file formats of the media player, wherein said selecting comprises selecting the corresponding shadow file when said shadow file exists and is in a format preferred by the media device over the format of the converted media file, and wherein said selecting further comprises retrieving the shadow file from the determined location as a function of the selected media content; and providing the selected media file from the computing device to the media device.

6. The method of claim 5 wherein determining comprises:
receiving from the media device an ordered list of file formats supported by said media device; or
receiving a parameter from the media device; and
retrieving from a memory a ranking of preferred file formats associated with the parameter.

7. The method of claim 6 wherein the ranking of preferred file formats is an ordered list of file formats supported by the media device.

8. The method of claim 5 wherein identifying media files comprises:
locating the selected media content in the database; and
determining media files representing the selected media content based on the location of the selected media content in the database.

9. The method of claim 5 further comprising converting the selected media content to a determined preferred file format when none of the identified file formats of the identified corresponding media files are preferred by the media device.

10. A computer readable storage media having computer executable instructions for a media player on a computing device of a user, said computer executable instructions comprising:
a conversion component for:
 receiving an original media file including a first media content at the computing device of the user;
 identifying a file format of the received original media file;
 if the media player is able to render the identified file format, storing the original media file as a primary file in a database of a media library and further storing content data in the database, said content data relating to and identifying the first media content;
 if the media player is unable to render the identified file format:
  selecting a plug-in from a plurality of plug-ins as a function of the identified format of the original media file;
  providing the original media file to the selected plug-in wherein the selected plug-in generates a corresponding second media file consisting of the first media content of the original media file in a second file format which the media player is able to render, wherein the rendering of the original file is the same as the rendering of the second file;
 renaming the original media file as a function of the first media content and a predetermined naming convention;
 storing the original media file as a shadow file hidden from the user on a computer readable storage media of the computing device of the user at a location determined as a function of the first media content and a predetermined locating convention;
 storing the second media file on the computer readable storage media; and
 storing content data in a database relating to and identifying the first media content of both the shadow file and the primary file without storing any association data between the shadow file and the primary file, wherein the database provides a user interface for displaying the content data to the user, permitting the user to select media content to be synchronized to a media device; and
a synchronization component for:
 receiving a synchronization request from a media device;
 determining one or more preferred file formats of the media device, wherein the media device is operatively coupled to the computing device of the user, said determining comprising:
  querying the media device for one or more preferred file formats of the media device; and
  receiving data indicative of one or more preferred file formats of the media device at the computing device of the user from the media device in response to said querying;
 identifying media files including the selected media content specified in the received synchronization request and identifying the file format of the identified media files, wherein the selected media content is the first media content, and wherein said identifying comprises determining whether the selected media content has a corresponding shadow file;

selecting one of the identified media files as a function of the identified file format of each media file and as a function of the determined preferred file formats of the media player, wherein said selecting comprises selecting the corresponding shadow file when said shadow file exists and is in a format preferred by the media device over the format of the second media file, and wherein said selecting further comprises retrieving the shadow file from the determined location as a function of the selected media content; and providing the selected media file from the computing device to the media device.

11. The computer readable storage media of claim 10 further comprising a rendering component able to render files in the format of the second media file; and wherein the database provides a user interface for displaying the content data, permitting the user to select media content to be rendered by the media player, and providing the file corresponding to the selected media content to the rendering component for rendering, said provided file having a format which the media player is able to render.

12. The computer readable storage media of claim 10 wherein the identified media files are media files residing on the computing device to which the media device is operatively coupled.

13. The computer readable storage media of claim 10 wherein determining comprises:

receiving from the media device an ordered list of file formats supported by said media device; or receiving a parameter from the media device; and retrieving from a memory a ranking of preferred file formats associated with the parameter.

14. The computer readable storage media of claim 13 wherein the ranking of preferred file formats is an ordered list of file formats supported by the media device.

15. The computer readable storage media of claim 10 wherein identifying media files comprises:

locating at the determined location in the database media content corresponding to the selected media content; and determining media files associated with the selected media content based on the location of the located media content in the database.

16. The computer readable storage media of claim 10 wherein the user selected media content is a user selected media file.

17. The computer readable storage media of claim 10 wherein the synchronization component converts the user selected media content to a determined preferred file format when none of the identified file formats of the identified corresponding media files are preferred by the media device.

* * * * *